United States Patent
Lee

(10) Patent No.: US 7,364,817 B2
(45) Date of Patent: Apr. 29, 2008

(54) SECONDARY BATTERY AND METHOD OF MANUFACTURING THE SAME

(75) Inventor: Sang-Won Lee, Suwon-si (KR)

(73) Assignee: Samsung SDI Co., Ltd, Suwon-si (KR)

( * ) Notice: Subject to any disclaimer, the term of this patent is extended or adjusted under 35 U.S.C. 154(b) by 0 days.

(21) Appl. No.: 11/192,235

(22) Filed: Jul. 27, 2005

(65) Prior Publication Data

US 2006/0024572 A1  Feb. 2, 2006

(30) Foreign Application Priority Data

Jul. 28, 2004 (KR) ............. 10-2004-0059205

(51) Int. Cl.
*H01M 2/26* (2006.01)
*H01M 10/36* (2006.01)

(52) U.S. Cl. .............. 429/161; 429/94; 429/164; 429/211

(58) Field of Classification Search ............. None
See application file for complete search history.

(56) References Cited

U.S. PATENT DOCUMENTS

| | | | |
|---|---|---|---|
| 3,761,314 A * | 9/1973 | Cailley ............. | 429/94 |
| 6,193,765 B1 | 2/2001 | Nakanishi et al. | |
| 6,372,380 B1 | 4/2002 | Kitami et al. | |
| 2002/0110729 A1* | 8/2002 | Hozumi et al. ........ | 429/130 |
| 2004/0023108 A1 | 2/2004 | Nakanishi et al. | |
| 2004/0131930 A1* | 7/2004 | Nakanishi et al. ..... | 429/161 |
| 2004/0191612 A1* | 9/2004 | Akita et al. .......... | 429/94 |

FOREIGN PATENT DOCUMENTS

| | | |
|---|---|---|
| CN | 1481039 A | 3/2004 |
| JP | 9-92338 | 4/1997 |
| JP | 09-092338 | * 4/1997 |
| JP | 2000-40502 | 2/2000 |
| JP | 2000-277154 | 10/2000 |
| JP | 2001-60456 | 3/2001 |
| JP | 2001-102029 | 4/2001 |
| JP | 2001-160387 | 6/2001 |
| JP | 2002-75435 | 3/2002 |
| JP | 2003-7346 A | 1/2003 |
| JP | 2003-272600 | 9/2003 |

(Continued)

OTHER PUBLICATIONS

Patent Abstracts of Japan, Publication No. 09-092338; Publication Date: Apr. 4, 1997; in the name of Iwazu et al.

(Continued)

*Primary Examiner*—John S. Maples
(74) *Attorney, Agent, or Firm*—Christie, Parker & Hale, LLP

(57) ABSTRACT

A secondary battery includes an electrode assembly including a positive electrode, a negative electrode and a separator interposed therebetween. A container receives the electrode assembly, and a cap assembly is fixed to the container to seal the container. A collector plate is electrically connected to the electrode assembly. The positive electrode, the negative electrode, or both has an uncoated region uncoated with active material. The uncoated region has a bent portion and the collector plate can be electrically connected to the bent portion of the uncoated region.

14 Claims, 5 Drawing Sheets

FOREIGN PATENT DOCUMENTS

JP          2004-119330          4/2004

OTHER PUBLICATIONS

Patent Abstracts of Japan, Publication No. 2001-160387; Publication Date: Dec. 6, 2001; in the name of Sato et al.
Patent Abstract of Japan, Publication No. 2001-102029, Published Apr. 13, 2001, in the name of Zama.
Patent Abstracts of Japan for Publication No: 2000-040502, Date of publication of application Feb. 8, 2000, in the name of Oweis et al.
Patent Abstracts of Japan, Publication No. 2001-060456, dated Mar. 6, 2001, in the name of Nakamura et al.
Patent Abstracts of Japan for Publication No: 2002-075435, Date of publication of application Mar. 15, 2002, in the name Kojima.
Patent Abstract of Japan, Publication No. 2003-007346, Published on Jan. 10, 2003, in the name of Kito, et al.
Patent Abstracts of Japan for Publication No. 2003-272600; Date of published of application Sep. 26, 2003, in the name of Koichi et al.
Patent Abstracts of Japan, Publication No. 2000-277154 in the name of Maeda et al., Published on Oct. 6, 2000.
Patent Abstracts of Japan, Publication No. 2004-119330, in the name of Nakanishi et al., Published on Apr. 15, 2004.

\* cited by examiner

SECONDARY BATTERY AND METHOD OF MANUFACTURING THE SAME

CROSS-REFERENCE TO RELATED APPLICATION

This application claims priority to and the benefit of Korean Patent Application No. 10-2004-0059205 filed with the Korean Intellectual Property Office on Jul. 28, 2004, the entire content of which is incorporated herein by reference.

BACKGROUND OF THE INVENTION

1. Field of the Invention

The present invention relates to a secondary battery, and more particularly, to an electrode assembly for a secondary battery in which the welding characteristics of the collector plate against the electrode plate are improved, and a method of manufacturing the same.

2. Description of the Related Art

Unlike a primary battery, a secondary battery may be recharged.

A low power secondary battery, in which one battery cell is made into a battery pack, is used as a power source for various portable electronic devices such as cellular phones, laptop computers, and camcorders. The high power secondary battery in which several to tens of battery cells are made into a battery pack is used as the power source for motor driven devices such as hybrid electric vehicles.

Depending on the external shape, secondary batteries may be classified into different types, for example, square and cylindrical batteries.

The secondary battery includes an electrode assembly in which positive and negative electrodes of a belt shape are wound with a separator interposed therebetween. The electrode assembly is placed inside a container, and a cap assembly having an external terminal is mounted in the container.

Conductive taps are attached to the positive and negative electrodes, respectively, to collect electric current generated from the electrode assembly to the cap assembly or the container. The taps are fixed to the positive and negative electrodes by welding, etc.

A bulk size secondary battery requiring high power has a collector plate of a plate shape for the taps, such as that disclosed in U.S. Pat. No. 6,193,765.

However, in a secondary battery having the collector plate, when the collector plate is electrically connected to the electrode assembly, there is a problem that the probability of damaging the connection is high.

Generally, the collector plate is connected to an uncoated region, a portion which is uncoated with active material on the collector of the positive and negative electrodes, by welding. However, when the collector plate and the uncoated region contact each other, the uncoated region is easily bent by the force of the collector plate. This bending direction may be non-uniform, and accordingly, the uncoated region does not properly contact the collector plate.

Therefore, the contact between the collector plate and the uncoated region is poor, and moreover, the welding between these two elements is not properly carried out.

When such a problem occurs in a bulk size secondary battery requiring high power, such as hybrid electric vehicle, not only the secondary battery but also the device using the secondary battery as a module for power source can be seriously damaged.

SUMMARY OF THE INVENTION

There is provided a secondary battery which can enhance the fixing state of the collector plate and the electrode assembly.

Also, there is provided a method of manufacturing the above secondary battery.

According to one aspect of the present invention, a secondary battery comprises an electrode assembly including a positive electrode, a negative electrode and a separator interposed therebetween. A container receives the electrode assembly, and a cap assembly is fixed to the container to seal the container. A collector plate is electrically connected to the electrode assembly.

At least one of the positive electrode and the negative electrode has an uncoated region uncoated with active material, the uncoated region has a bent portion. The collector plate can be electrically connected to the bent portion of the uncoated region. In one embodiment, the bent portion has multiple layers that are bent in a same direction.

The uncoated region can be formed along the edge of the at least one of the positive and negative electrodes.

The uncoated region can be formed along the edge of both the positive electrode and the negative electrode, and the positive uncoated region and the negative uncoated region are arranged opposite to each other.

The electrode assembly can have a jellyroll configuration, and the bent portion of the uncoated region can be bent toward the center of the electrode assembly.

The bent portion of the uncoated region can be formed in the uncoated region corresponding to a portion contacting the collector plate.

The uncoated region can be cut at a predetermined space and separated into plural uncoated regions, and the bent portion can be formed by bending at least one portion of the separated plural uncoated regions.

The collector plate can be directly contacted and fixed to the bent portion.

The collector plate can be fixed to the bent portion by welding.

The collector plate can have a protrusion portion contacting and fixed to the bent portion, and a groove can be formed inside the protrusion portion.

According to another aspect of the present invention, a method of manufacturing a secondary battery with an electrode assembly having a separator interposed between a positive electrode and a negative electrode, the positive electrode and the negative electrode having an uncoated region uncoated with active material, includes moving a mold positioned outside the electrode assembly to the uncoated region to bend the uncoated region. The aspect further includes electrically connecting a collector plate to the bent portion of the uncoated region. In one embodiment, the uncoated region is formed in multiple layers, and the multiple layers are bent in a same direction.

According to another aspect of the present invention, a method of manufacturing a secondary battery with an electrode assembly having a separator interposed between a positive electrode and a negative electrode, the positive electrode and the negative electrode having a vertically arranged uncoated region uncoated with active material, includes linearly moving a mold having an inclined plane to the vertically arranged uncoated region to allow a front end of the inclined plane to press the uncoated region. The aspect further includes rotating the mold around the front end of the inclined plane along a central axis to bend the uncoated region.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
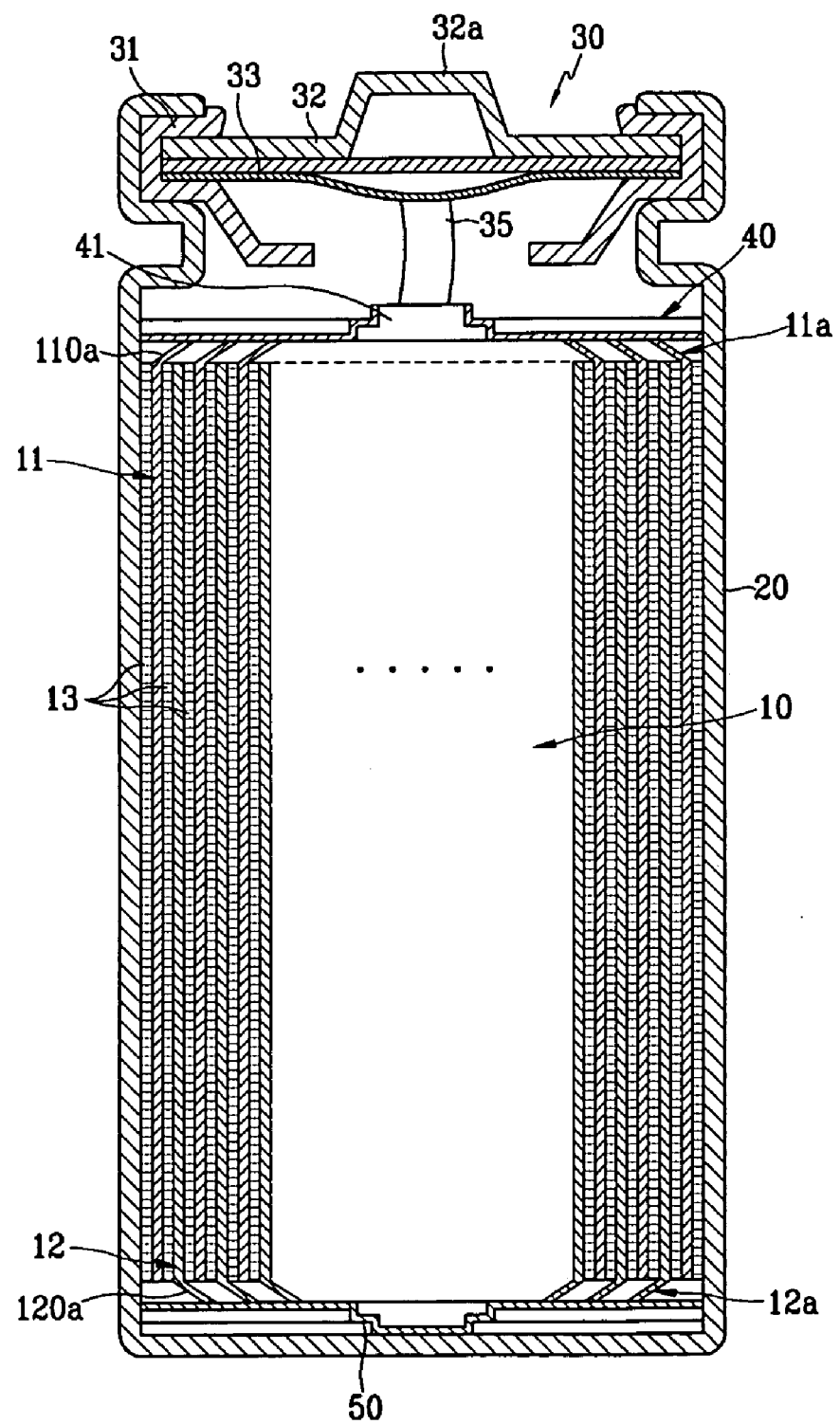
FIG. 1 is a cross-sectional view of a secondary battery according to a first embodiment of the present invention.

FIG. 1 is a cross-sectional view of a secondary battery according to a first embodiment of the present invention.

As shown in the drawing, the secondary battery according to the present embodiment includes an electrode assembly 10 having a positive electrode 11, a negative electrode 12 and a separator 13 interposed between those two electrodes, a container 20 of a cylindrical shape having an opening at one end thereof to receive the electrode assembly 10 inside the container together with an electrolyte, and a cap assembly 30 mounted on the opening of the container 20 through a gasket 31 to thereby seal the container 20. Positive and negative collector plates 40 and 50 are electrically connected to the positive and negative electrodes 11 and 12 of the electrode assembly 10.

The container 20 is made of conductive metal such as aluminum, aluminum alloy, or steel plated with nickel, and its shape can be a cylinder having an inner space to receive the electrode assembly 10.

The cap assembly 30 includes a cap plate 32 having an external terminal 32a, and a gasket 31 insulating the cap plate 32 from the container 20. The cap assembly 30 can further include a vent plate 33 which is broken at a prescribed pressure level and discharges the gas to thereby prevent the explosion of the battery.

The vent plate 33 is electrically connected to the positive collector plate 40 through a lead 35. The vent plate 33 is not limited to the shape of the drawing, and it can be varied to any structure which can short-circuit the electrical connection between the external terminal 32a and the electrode assembly 10 through the lead 35 at a prescribed pressure level.

The electrode assembly 10 has a stacked layer structure such that the separator 13 is interposed between the positive electrode 11 and the negative electrode 12 which have collectors coated with the corresponding active material, respectively. The embodiment shown in FIG. 1 has a jellyroll structure such that the positive electrode 11, the negative electrode 12 and the separator 13 in a stacked layer are wound into a jellyroll configuration.

The present embodiment shows, as an example, a secondary battery having a container 20 of a cylindrical shape in which the electrode assembly 10 of a jellyroll configuration is mounted.

The positive electrode 11 and the negative electrode 12 of the electrode assembly 10 according to the present embodiment have uncoated regions 11a and 12a formed by not coating the active material over the collectors. The uncoated regions 11a and 12a are formed along one edge of the positive electrode 11 and the negative electrode 12 along the longitudinal direction of the positive electrode 11 and the negative electrode 12, respectively.

The positive uncoated region 11a and the negative uncoated region 12a are arranged to be opposite to each other, and as the electrode assembly 10 is formed in a jellyroll configuration, both of the uncoated regions 11a and 12a are arranged in a multiple layers.

The uncoated regions 11a and 12a have bent portions which are bent toward the same direction, in this case toward the center axis of the electrode assembly.

With reference to FIG. 1, the uncoated region 11a of the positive electrode 11 is arranged at one side of the electrode assembly 10 (the upper side in the drawing), and the positive uncoated region 11a has a bent portion 110a uniformly bent toward the center of the electrode assembly 10. The positive collector plate 40 contacts and is fixed to the bent portion 110a.

Like the above, the negative uncoated region 12a is arranged on the opposite side of the electrode assembly 10 (the lower side in the drawing), and the negative uncoated region 12a also has a bent portion 120a bent toward the center of the electrode assembly 10. The negative collector plate 50 contacts and is fixed to the bent portion 120a.

In the present embodiment, the fixing of the positive collector plate 40 and the bent portion 110a of the positive uncoated region 11a, and the fixing of the negative collector plate 50 and the bent portion 120a of the negative uncoated region 12a are carried out by laser welding.

Since, in the present embodiment, the positive collector plate 40 and the negative collector plate 50 have the similar shape, and the fixing to the bent portions 110a and 120a of the uncoated regions 11a and 12a is carried out by a similar method, the following will explain the structure and the fixing structure only for the positive collector plate 40 and the bent portion 110a of the positive uncoated region 11a, but it can be applied to both of the positive electrode and the negative electrode.

Figure 2:
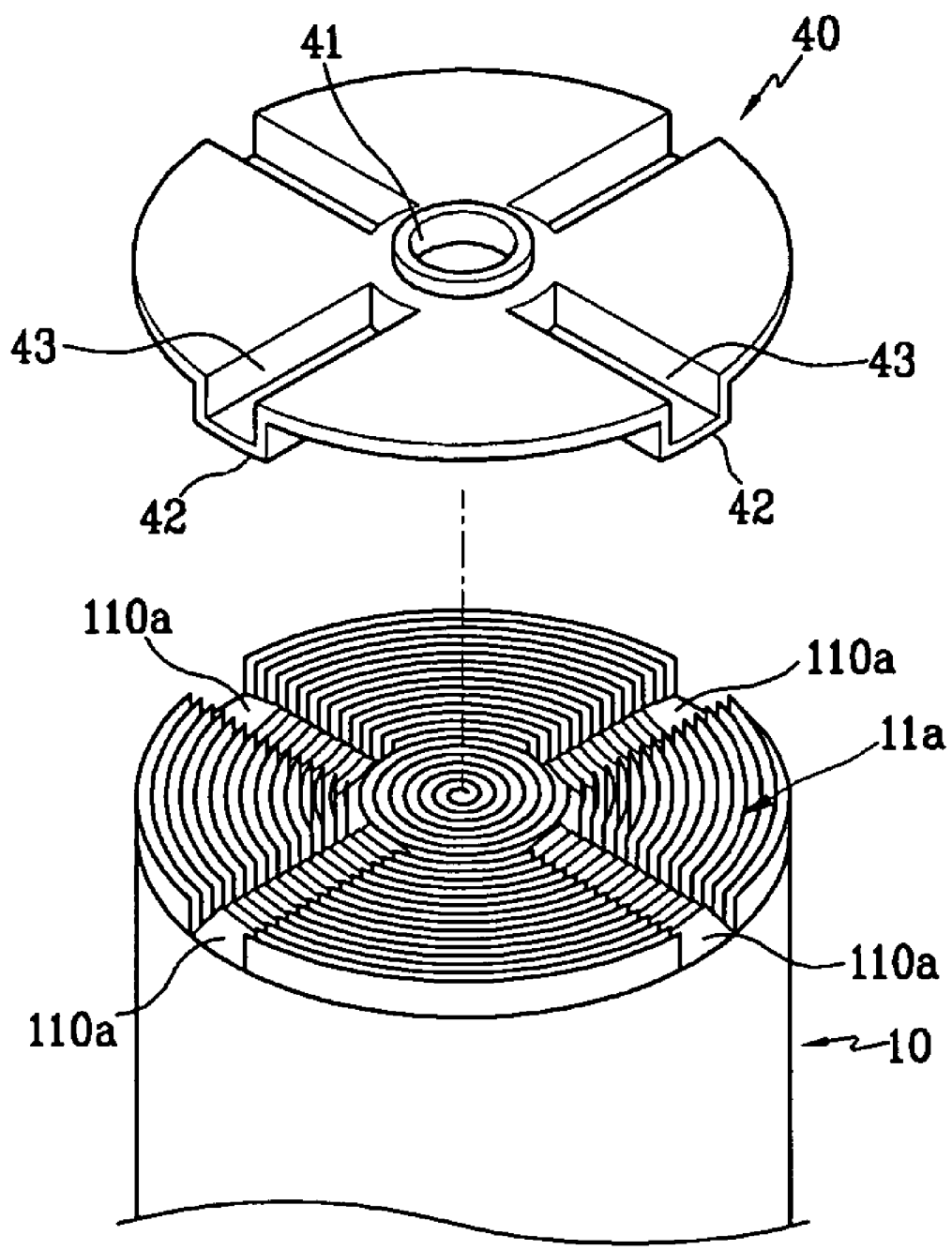
FIG. 2 is an exploded perspective view illustrating a collector plate and an electrode assembly of the secondary battery shown in FIG. 1.

With reference to FIG. 2, the overall shape of the positive collector plate 40 is a disk shape, and a hole 41 of a ring shape is formed in its center. Protrusion portions 42 are arranged in a cross shape with respect to the hole 41, and the protrusion portions 42 directly contact and are fixed by laser welding to the bent portion 110a of the positive uncoated region 11a. That is, the positive collector plate 40 can be electrically connected to the positive uncoated region 11a by these protrusion portions 42. A groove 43 is formed inside the protrusion portions 42.

Corresponding to the shape of the positive collector plate 40, the bent portions 110a of the positive uncoated region 11a are also arranged in a cross shape with respect to the center of the electrode assembly 10.

Such structure of the positive collector plate 40 and the positive uncoated region 11a allows the protrusion portions 42 to be contacted and fixed to the bent portion 110a of the positive uncoated region 11a.

That is, since the positive collector plate 40 contacts and is fixed only to the bent portion 110a of the positive uncoated region 11a, the contact area of the present invention is much larger than the conventional one, and also contact state between them can be stably maintained.

Figure 3:
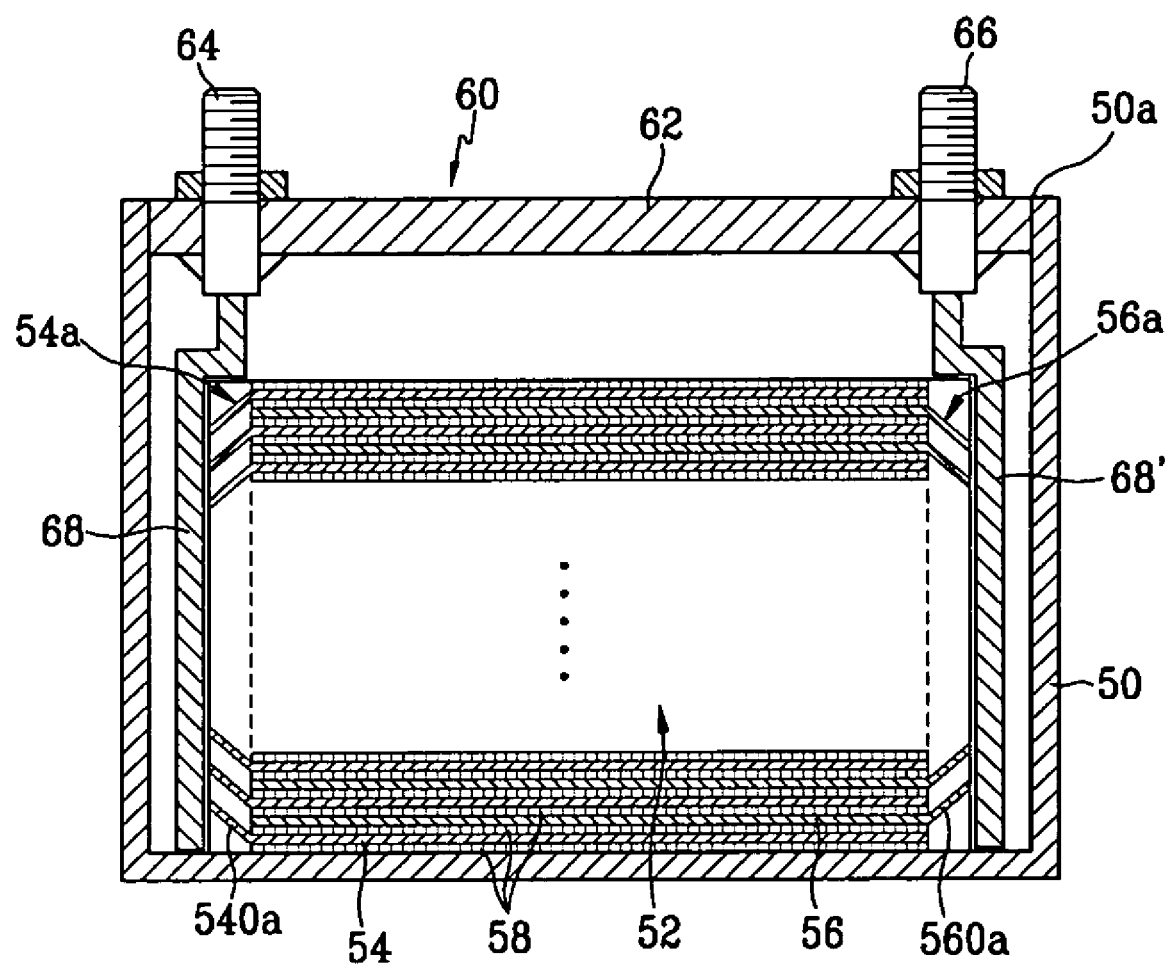
FIG. 3 is a cross-sectional view of a secondary battery according to a second embodiment of the present invention.

FIG. 3 is a second embodiment of the present invention, which shows a secondary battery of a square shape.

In this secondary battery, an electrode assembly 52 mounted inside a container 50 also has a positive electrode 54, a negative electrode 56 and a separator 58. The positive electrode 54 and the negative electrode 56 have bent portions 540a and 560a in each of uncoated regions 54a and 56a like the electrode assembly of the secondary battery mentioned in the above embodiment.

In this secondary battery, a positive terminal 64 and a negative terminal 66 are disposed in a cap plate 62 of a cap assembly 60 mounted on the opening 50a of the container 50 to seal the container 50. Lead connectors 68 and 68' directly contact and are fixed to the bent portions 540a and 560b of both of the uncoated regions 54a and 56a and are connected to the positive terminal 64 and the negative terminal 66, respectively.

The bent portion 540a of the positive uncoated region 54a and the bent portion 560a of the negative uncoated region 56a are bent to the center of the electrode assembly 52. The arrangement shape thereof could be a cross shape like the above embodiment, but is not limited thereto.

The lead connectors 68 and 68' can have a shape corresponding to the shape of the arrangement of the bent portions 540a and 560a.

The present invention of the above structure can be applied to any secondary battery, such as a cylindrical or square shape regardless of the shape of the secondary battery.

The bent portion of the uncoated region of the secondary battery according to one embodiment of the present invention can be formed by the following method. In the following, the positive uncoated region of the cylindrical secondary battery according to the embodiment shown in FIGS. 1 and 2 will be explained as an example for convenience.

Figure 4:
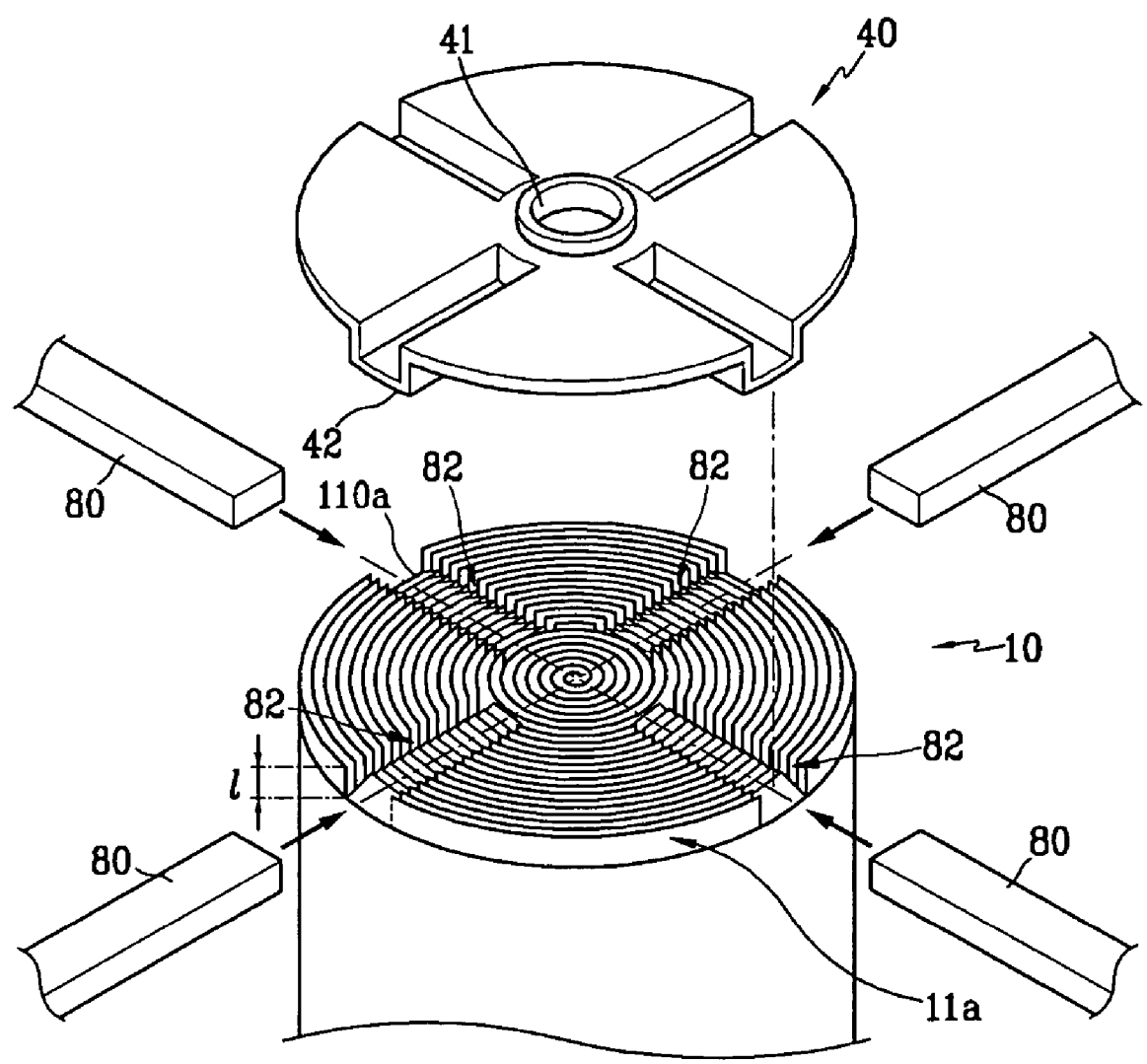
FIG. 4 is a drawing illustrating a method of forming a bent portion in a uncoated region of an electrode assembly according to one embodiment of the present invention.

With reference to FIG. 4, a mold 80 of a rectangular stick shape is positioned outside the positive uncoated region 11a corresponding to the protrusion portion 42 of the positive collector plate 40 to bend the positive uncoated region 11a.

Then, the mold 80 is moved from outside of the electrode assembly 10 toward the center of the electrode assembly 10. The portions of the positive uncoated region 11a arranged in a multiple layers where the mold 80 moves, that is, where the uncoated region 11a is pressed by the mold 80, are sequentially bent toward the center of the electrode assembly 10.

The width of the mold 80 corresponds to the width of the protrusion portion 42 of the positive collector plate 40.

When the bent portions 110a of the positive uncoated region 11a are formed in a cross shape by the mold 80, the molds 80 corresponding to each of the bent portions 110a can be moved toward the center of the electrode assembly 10 sequentially or simultaneously.

The portion of the positive uncoated region 11a where the mold 80 moves can be cut in advance according to the width of the mold 80. This forms a cut line 82 on the positive uncoated region 11a at a predetermined space to separate the positive uncoated region 11a into plural uncoated regions, which allows any portions to be easily bent when the mold 80 presses them.

That is, the cut line 82 could be the border line to divide a bent portion and a not-bent portion of the positive uncoated region 11a.

The length of the cut line 82 can correspond to the length of the protrusion portion 42 of the positive collector plate 40.

As described above, if the cut line 82 is formed on the positive uncoated region 11a before the mold 80 is moved along the positive uncoated region 11a, since the portion of the positive uncoated region 11a in the area bent by the mold 80 has been already cut at its both ends by the cut line 82, it can be more easily bent to be laid down when pressed by the mold 80, and the flatness can be enhanced as well.

Figure 5:
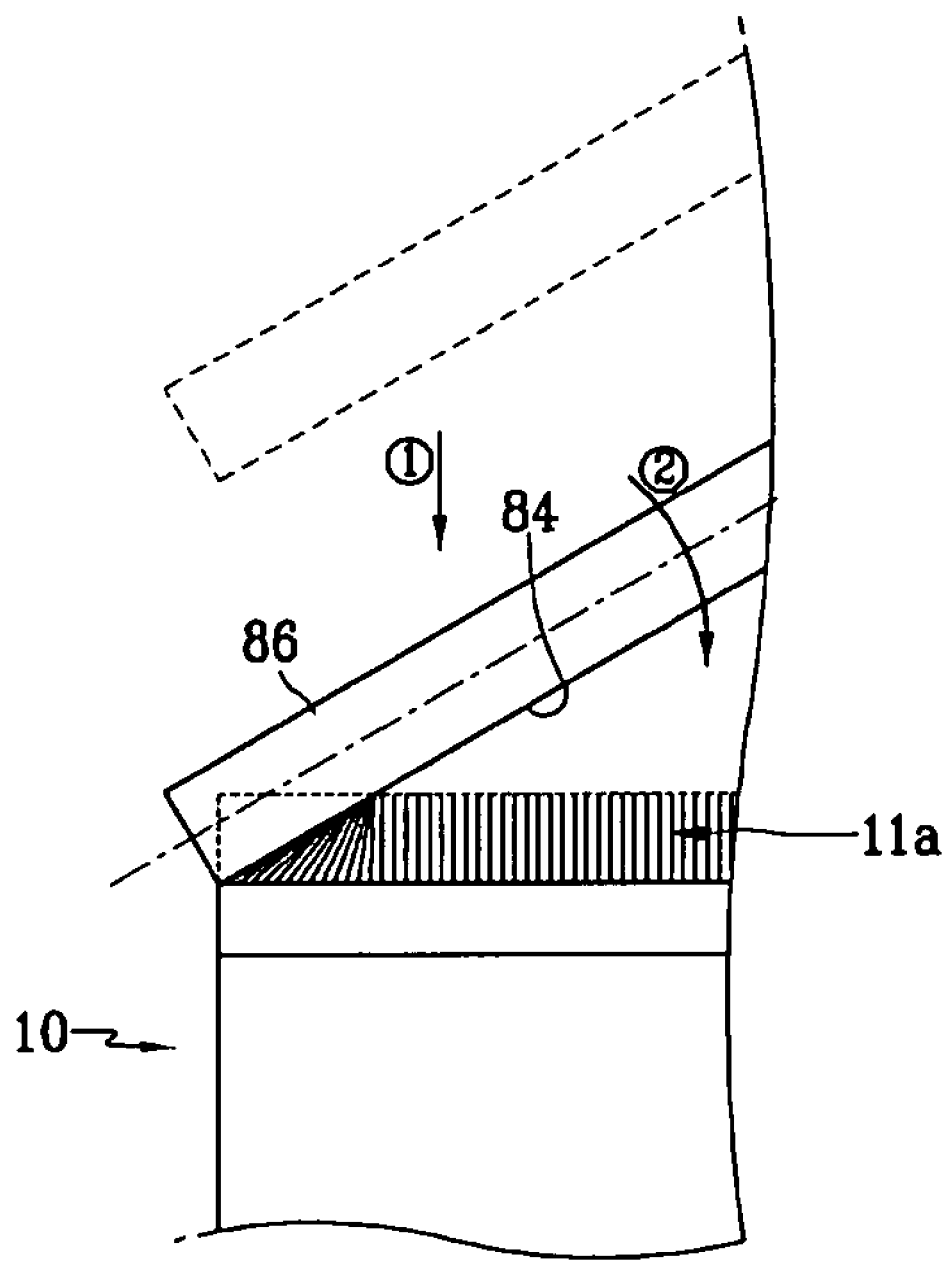
FIG. 5 is a drawing illustrating a method of forming a bent portion in an uncoated region of an electrode assembly according to another embodiment of the present invention.

FIG. 5 is a drawing illustrating a method of bending the positive uncoated region 11a according to another embodiment of the present invention. In this embodiment, a mold 86 having an inclined plane 81 is used to form the bent portion in the positive uncoated region 11a.

That is, after the mold 86 having an inclined plane 81 with respect to the vertically arranged positive uncoated region 11a is positioned over the positive uncoated region 11a, the mold 86 is linearly moved toward the positive uncoated region 11a to allow the front end of the inclined plane 81 of the mold to press one side of the positive uncoated region 11a (the outermost side of the electrode assembly).

Accordingly, in the positive uncoated region 11a, portions positioned at the outermost side are firstly pressed by the inclined plane 81 of the mold 86 to be bent.

Then, if the mold 86 is rotated around the front end of the mold 86 as the central axis to be positioned horizontally with respect to the positive uncoated region 11a, the positive uncoated regions 11a in a multiple layers are sequentially pressed by the inclined plane 81 to be bent.

The secondary battery with the structure described in the above embodiments can thus uniformly flatten the uncoated region to maximize the contact area with the collector plate. Such secondary battery can be used as the power source for motor driving devices such as the hybrid electric vehicles, electric vehicles, wireless vacuum cleaners, motorbikes, or motor scooters requiring high power and bulk size.

According to these embodiments, the secondary battery can maximize the contact area between the uncoated region and the collector plate, and reduce the welding defects between the uncoated region and the collector plate.

In addition, since the collector plate and the uncoated region uniformly contact, the internal resistance and the output can be constant, which can increase the reliability of the products.

Although a few examples of embodiments of the present invention have been shown and described, it would be appreciated by those skilled in the art that changes may be made to these embodiments without departing from the principles and spirit of the invention, the scope of which is defined in the claims and their equivalents.

What is claimed is:

1. A secondary battery, comprising:
   an electrode assembly including a positive electrode, a negative electrode and a separator interposed therebetween;
   a container receiving the electrode assembly inside thereof;
   a cap assembly fixed to the container to seal the container; and
   a generally disk-shaped collector plate having a plurality of protrusions, each protrusion comprising an indentation in the collector plate,
   wherein the positive electrode and the negative electrode have an uncoated region uncoated with active material,
   wherein portions of the uncoated region of the positive electrode or the negative electrode in the electrode assembly are bent at substantially a same angle to form a bent portion, and the protrusions of the collector plate are electrically connected to the bent portion of the electrode and a portion of the collector plate other than the protrusions is electrically connected to a not-bent portion of the uncoated region.

2. The secondary battery of claim 1 wherein the uncoated region is cut at a spacing and separated into multiple uncoated regions bent in a same direction to form the bent portion and multiple uncoated regions forming said not-bent portion.

3. The secondary battery of claim 1, wherein the uncoated region is formed along an edge of the at least one of the positive electrode or the negative electrode.

4. The secondary battery of claim 3, further comprising a second uncoated region formed along an edge of the other of the at least one of the positive electrode or the negative electrode, and the uncoated region and the second uncoated region are arranged opposite to each other.

5. The secondary battery of claim 4, wherein the electrode assembly has a jellyroll configuration, and the bent portion of the uncoated region is bent toward the center of the electrode assembly.

6. The secondary battery of claim 5, wherein a location of the bent portion of the uncoated region corresponds to a portion of the uncoated region contacting the collector plate.

7. The secondary battery of claim 1, wherein the uncoated region is cut at a predetermined spacing and separated into multiple uncoated regions, and the bent portion is formed by bending at least one portion of the separated plural uncoated regions.

8. The secondary battery of claim 1, wherein the collector plate directly contacts and is fixed to the bent portion.

9. The secondary battery of claim 8, wherein the collector plate is fixed to the bent portion by welding.

10. The secondary battery of claim 1, wherein the protrusion portion of the collector plate contacts and is fixed to the bent portion.

11. The secondary battery of claim 10, wherein a groove is formed inside the protrusion portion.

12. The secondary battery of claim 1, wherein the secondary battery has a cylindrical shape.

13. The secondary battery of claim 1, wherein the secondary battery has a square shape.

14. The secondary battery of claim 1, wherein the secondary battery is adapted to be used in a motor driven device.

* * * * *